United States Patent
Okumura et al.

(10) Patent No.: US 6,226,591 B1
(45) Date of Patent: May 1, 2001

(54) VEHICLE PRESENT POSITION DETECTION APPARATUS, VEHICLE PRESENT POSITION DISPLAY APPARATUS, NAVIGATION SYSTEM AND RECORDING MEDIUM

(75) Inventors: Mitsuo Okumura, Nisshin; Kiyoshi Tsurumi, Okazaki; Takahisa Ozaki, Gamagori, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/385,097

(22) Filed: Aug. 30, 1999

(30) Foreign Application Priority Data

Sep. 24, 1998 (JP) .................................................. 10-269831

(51) Int. Cl.⁷ .................................................. G01C 21/00
(52) U.S. Cl. ........................... 701/216; 701/210; 701/207
(58) Field of Search ............................. 701/76, 207, 208, 701/211, 213, 210, 214, 216, 217, 220, 221, 222; 702/97, 96, 94; 342/106, 107, 108, 109, 112, 113, 115

(56) References Cited

U.S. PATENT DOCUMENTS

| | | | |
|---|---|---|---|
| 4,792,907 | 12/1988 | Ikeda et al. | |
| 5,422,639 | * 6/1995 | Kobayashi et al. | 701/216 |
| 5,740,049 | * 4/1998 | Kaise | 701/216 |
| 5,796,613 | * 8/1998 | Kato et al. | 701/216 |
| 5,906,653 | * 5/1999 | Ichimura et al. | 701/210 |
| 6,064,925 | * 5/2000 | Kobayashi et al. | 701/216 |

FOREIGN PATENT DOCUMENTS

| | | |
|---|---|---|
| 805 358 | 11/1997 | (EP) . |
| 443914 | * 2/1992 | (JP) ..................................... 701/210 |
| 8-14927 | 1/1996 | (JP) . |

* cited by examiner

Primary Examiner—Richard M. Camby
(74) Attorney, Agent, or Firm—Pillsbury Winthrop LLP

(57) ABSTRACT

Navigation system, which can improve an accuracy of a travel distance calculation and an accuracy of present position detection even if an accuracy of a pulse data from a vehicle speed sensor is relatively low. The navigation system includes a gyroscope, a vehicle speed sensor and a navigation control portion. The navigation control portion calculates the travel direction based on outputs from the gyroscope and the vehicle speed sensor. When the vehicle decelerates, acceleration during low speed less than Vmin, in which the vehicle speed pulse is not outputted, is assumed to be equal to an acceleration just before the vehicle speed becomes less than Vmin. When the vehicle accelerates, acceleration during low speed less than Vmin, in which the vehicle speed pulse is not outputted, is assumed to be equal to an acceleration just after the vehicle speed becomes to or more than Vmin. Vehicle present position is calculated by estimating travel distances $Dist_{down}$ and $Dist_{up}$ which are estimated to travel during a pulse-missing period at deceleration and acceleration, and adding them to the travel distance Dist calculated based on the vehicle speed pulse from the vehicle speed sensor.

19 Claims, 5 Drawing Sheets

| DECELERATION | ESTIMATED TRAVEL DISTANCE |
|---|---|
| Δa down 1 | Dist down 1 |
| Δa down 2 | Dist down 2 |
| Δa down 3 | Dist down 3 |
| ⋮ | ⋮ |

FIG. 9B

| ACCELERATION | ESTIMATED TRAVEL DISTANCE |
|---|---|
| Δa up 1 | Dist up 1 |
| Δa up 2 | Dist up 2 |
| Δa up 3 | Dist up 3 |
| ⋮ | ⋮ |

VEHICLE PRESENT POSITION DETECTION APPARATUS, VEHICLE PRESENT POSITION DISPLAY APPARATUS, NAVIGATION SYSTEM AND RECORDING MEDIUM

CROSS REFERENCE TO RELATED APPLICATION

This application is based upon Japanese Patent Application No. Hei. 10-269831 filed on Sep. 24, 1998, the contents of which are incorporated herein by reference.

BACKGROUND OF THE INVENTION

1. Field of the Invention

This invention relates to a present position detection system, especially to a vehicle present position detection apparatus that performs a dead-reckoning navigation calculation using a travel distance of a vehicle calculated based on a travel direction of the vehicle and an output from a vehicle speed sensor wherein an accuracy of position detection can be improved even if a vehicle speed pulse is missed, and a vehicle present position display apparatus, a navigation system using the position detection, and a recording medium that stores a program for realizing a present position calculation.

2. Related Art

There has been known a navigation system, which displays a present position moving as a vehicle travels on a display unit with a road map, and performs a route guidance by setting an adequate route from the present position to a destination. Such a navigation system contributes smoother driving.

In the case of displaying the vehicle present position and performing the route guidance, it is essential to detect the vehicle present position. A conventional position detection is shown in Japanese patent application Laid-open No. Hei. 8-54248. This position detection is realized by a dead-reckoning navigation calculation using both an azimuth change amount calculated based on an output from a gyro-scope and a travel distance calculated based on an output from a vehicle speed sensor. However, since this technique is a "self-contained navigation" in which an own position is detected by itself, an absolute position can not be detected. Therefore, some countermeasures, in which the absolute position is detected by using radio for radio navigation sent from, for example, the GPS (Global Positioning System) satellite or road side beacon, have proposed to adequately detect the present position.

Here, in the case of using the radio from the GPS satellite, it needs to assume a generation of error of approximately 100 meters. Therefore, it is desired to make a correction using a so-called map-matching to improve an accuracy of the position detection. The map-matching makes a position estimation by comparing a travel locus of the vehicle until the present position calculated based on the dead-reckoning navigation (the self-contained navigation only, or adding the radio navigation) with road data based on map data.

However, when the error of the travel distance using the dead-reckoning navigation calculation becomes large, the present position may be matched to the wrong road as a result of a correction by the map-matching. It is thought that the wrong matching is due to the accuracy of pulse data from the vehicle speed sensor.

The vehicle speed sensor outputs pulse signals at an interval related to a travel speed. When a distance corresponds to one pulse interval is set to, for example, 0.4 meters, it can be detected to travel for 40 meters by counting 100 pulses, and it can detect a vehicle speed by dividing 40 meters by a time to output the 100 pulses. It may not be a problem if a detection ability of the vehicle speed sensor is high, for example, the speed sensor can output the pulse signal even less than 1 km/h. However, generally, an actual speed sensor can not obtain the pulse data when the vehicle speed is less than, for example, 3.2 km/h. This is because the vehicle speed sensor itself can not output the pulse signal at low speed, or the accuracy of pulse signal is lowered when the pulse signal is used as the pulse data after the vehicle speed sensor outputs the pulse signal even at less than 1 km/h.

That is, the accuracy of the pulse data is lowered when, for example, the pulse data from the vehicle speed sensor is commonly used by such as an ABS-ECU (Antilock Brake System Electronic Control Unit) and the other vehicle ECU. When the accuracy of the pulse signals is kept to high, a process load to deal with such a high accuracy pulse signal becomes high and it leads to increase a cost. Furthermore, the ABS-ECU does not need to input the pulse data at less than 1 km/h. These are the reasons the accuracy of the pulse data is lowered.

When the accuracy is lowered in that way, errors are accumulated during multiplying the travel distance for the present position detection. For example, when the vehicle repeats starting and stopping due to a traffic signal, a traffic congestion or the like, a vehicle speed pulse missing (hereinafter; pulse-missing), in which the pulse signal can not be obtained due to low speed travel less than, for example, 3.2 km/h, may occur. Although the travel distance due to the pulse-missing per one stopping and starting is approximately some meters at most, the travel distance will be more than some tens meters when the pair of stopping and starting is repeated by 10 times. Therefore, the travel distance may be detected as short as some tens meters than actual travel distance when the travel distance during the pulse-missing is accumulated by repeating the stopping and starting duo to the traffic congestion or the like. In that case, when the vehicle travels a road which intersects a plurality of roads at a short distance interval like a matrix, and when the vehicle turns at one of intersection, the vehicle may be detected to turn at an adjacent intersection before the actual intersection as a result of wrong map-matching due to the pulse-missing.

This inconvenience may be solved if an additional distance sensor for navigation ECU is provided, however, a number of sensors and harnesses of the sensors may increase in the vehicle as a whole. As a basic concept of vehicles, a number of the sensors and the harnesses is prevented from increasing by connecting a plurality of ECUs with a vehicle LAN (Local Area Network) and sharing data from the specific sensor among the ECUs in order to prevent the structure from complicating and to prevent a cost from increasing. Therefore, it is desired to improve the accuracy of a travel distance calculation and the accuracy of present position detection even if the accuracy of the pulse data from the vehicle speed sensor is relatively low.

SUMMARY OF THE INVENTION

This invention has been conceived in view of the background thus far described and its object is to improve the accuracy of a travel distance calculation and the accuracy of present position detection even if the accuracy of the pulse data from the vehicle speed sensor is relatively low.

According to the present invention, present position calculating means calculates a present position of the vehicle by a dead-reckoning navigation calculation using an azimuth change amount calculated based on an azimuth signal and a travel distance calculated based on the pulse signals. Here, the present position calculating means performs the dead-reckoning navigation calculation based on a corrected travel distance, which is the travel distance calculated based on the pulse signals and is corrected by adding an estimated travel distance (Dist) during a pulse-missing period during which the pulse signals are not inputted thereto when the vehicle travels. Furthermore, the present position calculating means estimates the estimated travel distance based on the travel accelerations ($\Delta a_{down}$, $\Delta a_{up}$) before and after the pulse-missing period. Therefore, the present invention can improve an accuracy of a travel distance calculation and an accuracy of present position detection even if an accuracy of pulse data from a vehicle speed sensor is relatively low.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

A preferred embodiment to which the present invention is adopted will be explained hereinafter with reference to accompanying drawings. Here, the present invention should not be restricted to the following embodiment.

Figure 1:
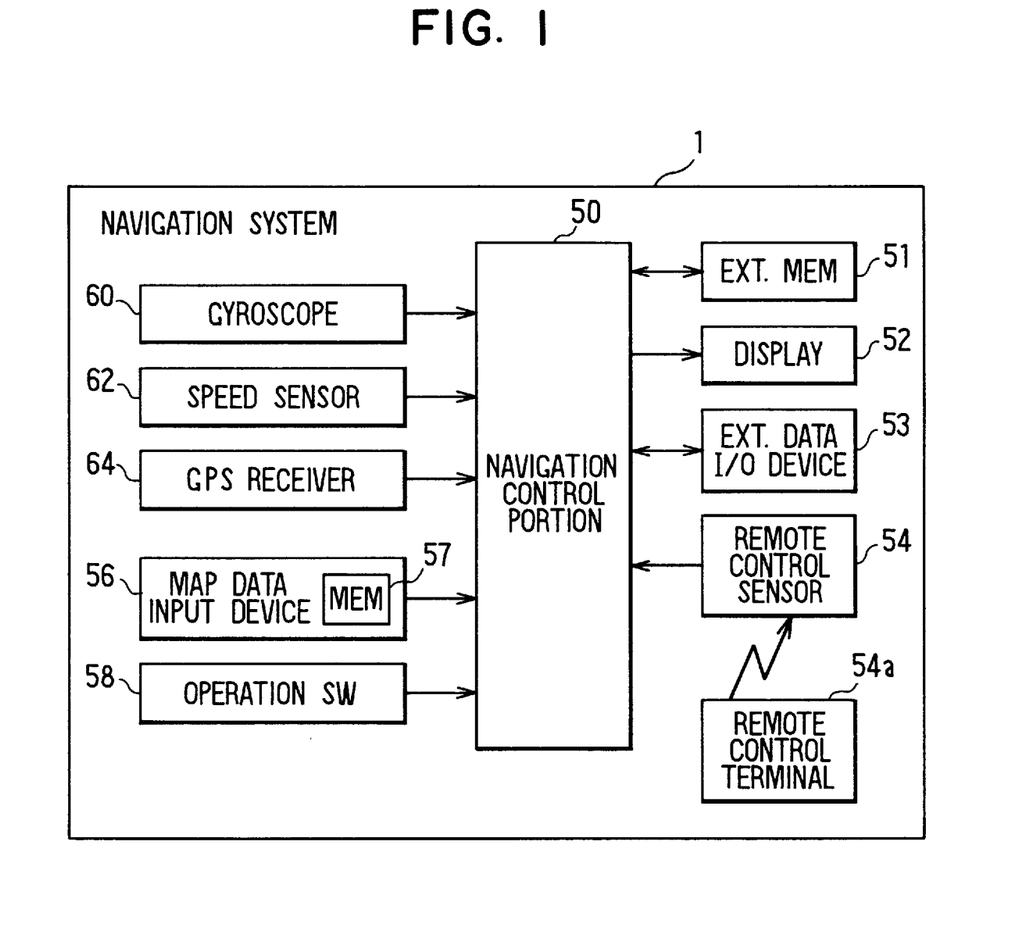
FIG. 1 is a schematic block diagram illustrating a whole construction of a navigation system according to the present invention.

FIG. 1 is a block diagram illustrating a whole structure of a navigation system 1 of this embodiment. The navigation system 1 includes a map data input device 56, a group of operation switches 58, a gyroscope 60, a vehicle speed sensor 62, a GPS (Global Positioning System) receiver 64, a navigation control portion 50 connected to the above-mentioned units 56, 58, 60, 62, 64, an external memory 51 connected the navigation control portion 50, a display unit 52, an external data input output (I/O) device 53, and a remote control sensor 54 to receive a signal from a remote control terminal 54a.

The navigation control portion 50 is constructed by a computer, and includes therein a CPU, a ROM, a RAM, an I/O, and a bus line connecting with these portions each other. The navigation control portion 50 also calculates data for dead-reckoning navigation such as the present position and the travel direction and the like based on outputs from the gyroscope 60, the vehicle speed sensor 62, and the GPS receiver 64. The navigation control portion 50 corresponds to present position calculating means.

The map data input device 56 has a memory (MEM) 57 as a recording medium, and outputs a variety of data including a so-called map-matching data, a map data and a landmark data to improve an accuracy of the position detection. Here, the memory as a recording medium can be selected from a CD-ROM and a DVD for amount of data, however, may be selected from a memory card or the like.

The group of operation switches 58 are terminals to input a destination or anther data or information by a user. The group of operation switches 58 are selected from such as a touch switch integrated with the display unit 52 and mechanical switch.

The gyroscope 60 is a kind of an azimuth sensor, and outputs a detection signal proportional to an angular speed of a rotational motion applied to a vehicle.

The vehicle speed sensor 62 outputs pulse signals at an interval proportional to a travel speed of the vehicle.

The GPS receiver 64 is a position detection device, and receives a transmission radio from a GPS satellite via a GPS antenna, and detects a vehicle present position, an azimuth (travel direction), travel speed, and the like.

The display unit 52 is a color display unit, and is capable of displaying a superposed picture of: a vehicle present position mark outputted from the GPS receiver 64; a map data from the map data input device 56; and a guidance route to be displayed on the map; on a display screen. Here, the display unit 52 can be selected from a CRT, a crystal display, a plasma display and the like.

The external data I/O device 53 receives data or information provided by an infrastructure such as a VICS (Vehicle Information and Communication System) system, and sends data or information to an external device. Data or information received from the external via the external data I/O device 53 is processed by the navigation control portion 50. Furthermore, the processed data or information is sent to the external device via the external data I/O device 53, if necessary.

The navigation system 1 of this embodiment has a so-called a route guidance function, that is, when a destination is inputted, the navigation system 1 automatically selects the adequate route from the present position to the destination and displays the selected route. Such a destination is inputted from the remote control terminal 54a via the remote control sensor 54 or from the operation switches 58 by a user. Here, Dijkstra's algorithm is known as the method for automatically setting such the adequate route. The navigation system 1 always executes a process that the vehicle present position is displayed with superposing with the map as well as the route guidance to the destination. That is because the mere the vehicle present potion is understandable can perform a kind of the navigation function, when the route guidance function is not turned on.

When a not-shown power supply switch is turned on, the navigation control portion 50 starts to execute a various of processes including a process of present position detection based on programs previously stored in a not-shown ROM. The process of vehicle present position detection will be explained hereinafter.

In this embodiment, the navigation control portion 50 detects the present position based on a measurement data by a radio navigation received by the GPS receiver 64, for example, before the vehicle starts, and superposes the detected present position with the map displayed on the display unit 52. When the vehicle starts to travel, the navigation control portion 50 calculates travel distance based on the pulse signals (vehicle speed pulses) proportional to the vehicle speed outputted from the vehicle speed sensor 62, and calculates an azimuth change amount based on a detected signal outputted from the gyroscope 60. After that, the navigation control portion 50 calculates the vehicle present position based on the calculated azimuth change amount and calculated travel distance, and if necessary further based on the GPS measurement data. Then, the vehicle present position is corrected by a map-matching process described after. The corrected vehicle present position is understandably displayed on the map on the display unit 52. Here, a relative locus and the vehicle speed are also calculated based on the azimuth change amount and the travel distance.

The correction of map-matching is the method to estimate the position by comparing the travel locus until the vehicle present position calculated based on the dead-reckoning navigation with the road data based on the map data.

However, when the error of the travel distance using the dead-reckoning navigation calculation becomes large, the present position may be matched to the wrong road as a result of a correction by the map-matching. It is thought that the wrong matching is due to the accuracy of pulse data from the vehicle speed sensor 62.

As described the above, the vehicle speed sensor 62 outputs pulse signals at an interval related to a travel speed. When a distance corresponds to one pulse interval is set to, for example, 0.4 meters, it can be detected to travel for 40 meters by counting 100 pulses, and it can detect a vehicle speed by dividing 40 meters by a time to output the 100 pulses. It may not be a problem if a detection ability of the vehicle speed sensor 62 is high, for example, the speed sensor 62 can output the pulse signal even less than 1 km/h. However, generally, an actual speed sensor 62 can not obtain the pulse data when the vehicle speed is less than, for example, 3.2 km/h. This is because the vehicle speed sensor 62 itself can not output the pulse signal at low speed, or the accuracy of pulse signal is lowered when the pulse signal is used as the pulse data after the vehicle speed sensor 62 outputs the pulse signal even at less than 1 km/h.

That is, the accuracy of the pulse data is lowered when, for example, the pulse data from the vehicle speed sensor is commonly used by such as an ABS-ECU (Antilock Brake System Electronic Control Unit) and the other vehicle ECU. When the accuracy of the pulse signal is kept to high, a process load to deal with such a high accuracy pulse signal becomes high and it leads to increase a cost. Furthermore, the ABS-ECU does not need to input the pulse data at less than 1 km/h. These are the reasons the accuracy of the pulse data is lowered.

Figure 2A:
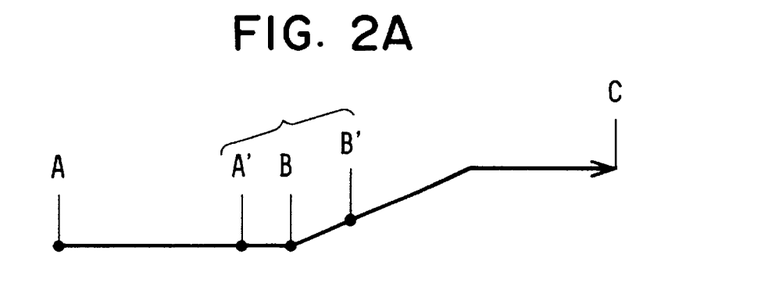
FIGS. 2A and 2B are diagrams illustrating a difference of a travel distance due to a pulse-missing.
Figure 2B:
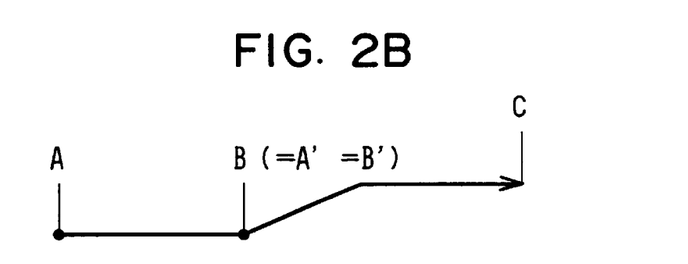

When the accuracy is lowered in that way, errors are accumulated during multiplying the travel distance for the present position detection. For example, the vehicle is assumed to stop at B-point shown in FIG. 2A due to a traffic signal, a traffic congestion or the like in a route from A-point to C-point. Because the vehicle stop at the B-point, the vehicle speed is less than 3.2 km/h during A'-point just before the B-point and C'-point just after the B-point. In such a low speed travel situation, the vehicle speed pulse is not outputted from the vehicle speed sensor 62 (pulse-missing), and the travel distance calculated based on the vehicle speed pulse is estimated zero. Therefore, as shown in FIG. 2B, the travel distance calculated based on the vehicle speed pulse is estimated shorter by a distance from the A'-point to B'-point in FIG. 2A.

Although the travel distance due to the pulse-missing per one stopping and starting is approximately some meters at most, the travel distance will be more than some tens meters when the pair of stopping and starting is repeated by 10 times. Therefore, the travel distance may be detected as short as some tens meters than actual travel distance when the travel distance during the pulse-missing is accumulated by repeating the stopping and starting duo to the traffic congestion or the like. In that case, when the vehicle travels a road which intersects a plurality of roads at a short distance interval like a matrix, and when the vehicle turns at one of intersection, the vehicle may be detected to turn at an adjacent intersection before the actual intersection as a result of wrong map-matching due to the pulse-missing.

This inconvenience may be solved if an additional distance sensor for navigation ECU is provided, however, a number of sensors and harnesses of the sensors may increase in the vehicle as a whole. As a basic concept of vehicles, a number of the sensors and the harnesses is prevented from increasing by connecting a plurality of ECUs with a vehicle LAN (Local Area Network) and sharing data from the specific sensor among the ECUs in order to prevent the structure from complicating and to prevent a cost from increasing. Therefore, it is desired to improve the accuracy of a travel distance calculation and the accuracy of present position detection even if the accuracy of the pulse data from the vehicle speed sensor 62 is relatively low.

Therefore, the navigation system 1 of this embodiment executes the following dead-reckoning navigation calculation. That is, when the pulse signal is not outputted from the vehicle speed sensor 62 despite of a vehicle traveling (pulse-missing), the navigation system 1 corrects the travel distance calculated based on the output value of the vehicle speed sensor 62 by adding a distance assumed that the vehicle has traveled during which the pulse-missing occurs. Furthermore, the navigation system 1 executes the dead-reckoning navigation calculation based on the corrected travel distance.

For example, when a vehicle speed pulse number (hereinafter; speed pulse number) SPN is detected changing from SPN>1 to SPN=0 based on the speed pulse number SPN outputted from the vehicle speed sensor 62 every a predetermined time in the past, it can detect starting of a pulse-missing period from the changing timing. Similarly, when the speed pulse number SPN is detected changing from SPN=0 to SPN>1, it can detect ending of the pulse-missing period at the changing timing. Then the navigation system 1 estimates the travel distance (estimated travel distance) during the pulse-missing period, and calculates a corrected travel distance by adding the estimated travel distance to the travel distance calculated based on the output from the vehicle speed sensor 62.

By correcting this way, it can obtain high accuracy travel distance data, and accordingly the detection accuracy of the present position can improve by using the high accuracy travel distance.

When the accuracy of the present position calculated by the dead-reckoning navigation calculation is high, it is effective when the present position is corrected by map-matching function because it can prevent the wrong map-matching. As described the above, when the travel distance is calculated based on only the vehicle speed pulse outputted without considering the pulse-missing, and when the present position is calculated based on such the travel distance, the travel distance may be shortened by some tens meters compared to the actual position, and the wrong map-matching, in which it is detected that the vehicle turns at an adjacent intersection before an intersection the vehicle actually turned, may occur. On the contrary, when the travel distance can be calculated accurately, it can prevent the wrong map-matching from occurring and can obtain a correction effect of the map-matching so that the detection accuracy of the present position can be improved.

Here, as a method for obtain "estimated travel distance during the pulse-missing period", it is thought there are mainly two methods; [1] a method in which the travel distance is estimated every time at the timing the pulse-missing occurs; and [2] a method in which the travel distance is previously stored. These methods will be explained hereinafter.

[1] Method using an estimation calculation

Figure 3:
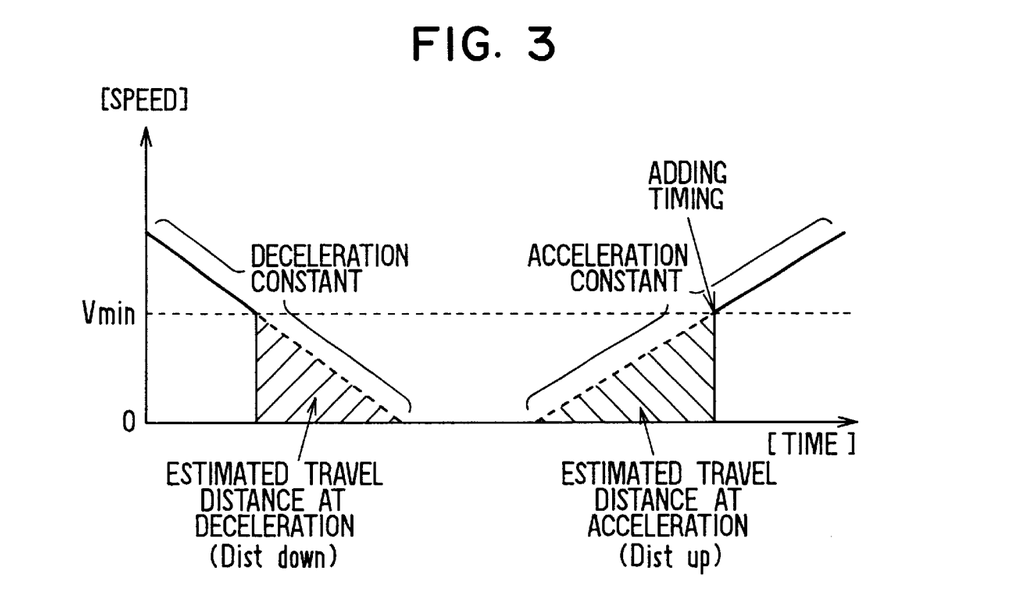
FIG. 3 is a diagram illustrating a concept of a calculation of an estimated travel distance during a pulse-missing period.

FIG. 3 shows a concept of the estimation calculation. That is, when the vehicle decelerates, an acceleration (deceleration) during low speed travelling situation less than vehicle speed Vmin, in which the vehicle speed pulse is not outputted, is assumed to be equal to an acceleration (deceleration) just before the vehicle speed becomes less than Vmin. Therefore, an area of a hatched region at left side in FIG. 3 corresponds to "estimated travel distance $Dist_{down}$ at deceleration". Similarly, when the vehicle accelerates, an acceleration during low speed travelling situation less than vehicle speed Vmin, in which the vehicle speed pulse is not outputted, is assumed to be equal to an acceleration just after the vehicle speed becomes to or more than Vmin. Therefore, an area of a hatched region at right side in FIG. 3 corresponds to "estimated travel distance $Dist_{up}$ at acceleration".

Figure 4:
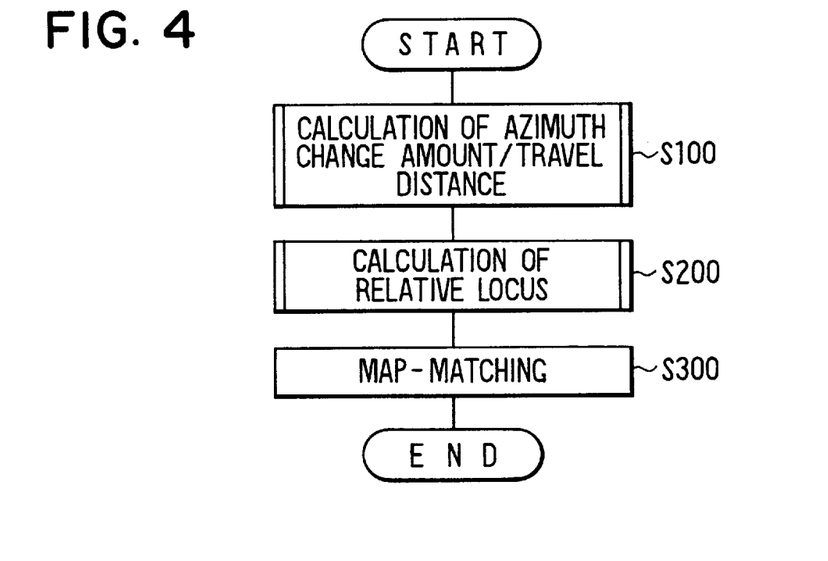
FIG. 4 is a flowchart illustrating a main process of a vehicle present position calculation.

Now a process of a vehicle present position calculation, in which the estimated travel distances $Dist_{down}$ and $Dist_{up}$ at deceleration and acceleration are calculated, and are added to the travel distance Dist calculated based on the vehicle speed pulse, will be explained hereinafter with reference to flowcharts shown in FIGS. 4 to 7. Here, this process is repeatedly executed (initialized) at a constant cycle. FIG. 4 shows a main process of the vehicle present position calculation.

As shown in FIG. 4, at step S100, a process of calculations of an azimuth change amount (ACA) and an travel distance (Dist) is executed.

This process will be explained in detail with reference to FIG. 5. At step S110, the azimuth change amount ACA is calculated by multiplying a gyro output angular speed detected by the gyroscope 60 and a start-up cycle T seconds of the main process together. At following step S120, an offset correction of the azimuth change amount ACA is executed by subtracting a value, of which a predetermined offset correction amount multiplied by the start-up cycle T seconds of the main process, from the azimuth change amount ACA calculated at step S110. At following step S130, a gain correction of the azimuth change amount ACA is executed by multiplying the azimuth change amount ACA offset-corrected at step S120 and a gain correction amount together. After that, at step S140, the travel distance Dist is calculated.

Figure 6:
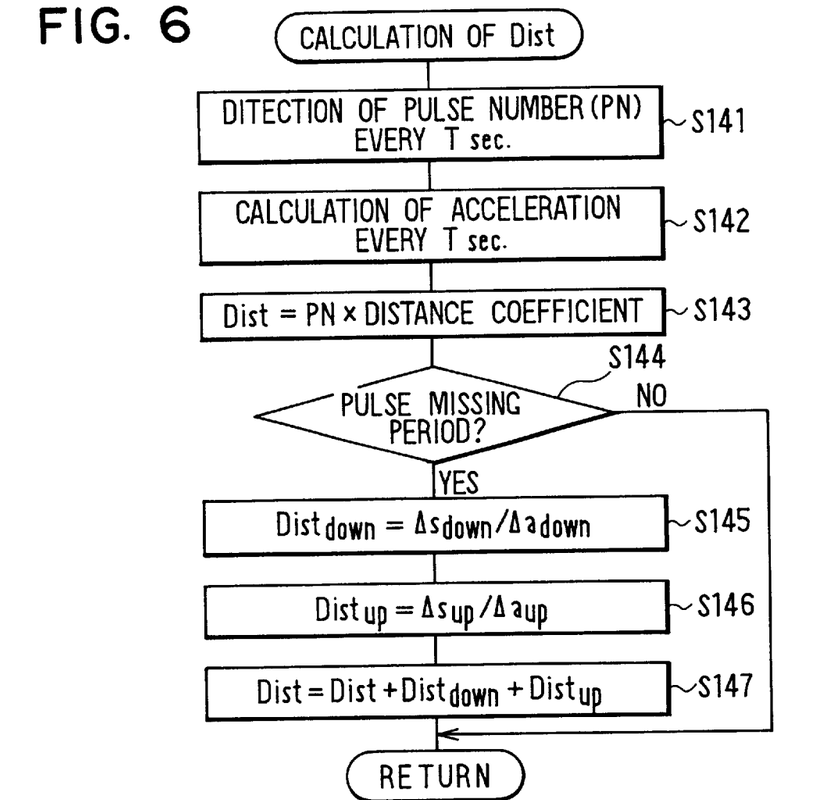
FIG. 6 is a flowchart illustrating a process of calculation of the travel distance executed during the process of calculation of the azimuth change amount and the travel distance.

A process of a calculation on the travel distance Dist executed at step S140 will be explained in detail with reference to FIG. 6. That is, at step S141, "speed pulse number SPN", which is an output pulse number from the vehicle speed sensor 62 during a period from this process is initialized last time to this process is initialized this time (i.e., during the start-up cycle T seconds), is detected. At following step S142, an acceleration every T seconds is calculated.

At step S143, the travel distance Dist is calculated by multiplying the speed pulse number SPN and a distance coefficient. The distance coefficient is a travel distance corresponds to the interval of the vehicle speed pulses outputted from the vehicle speed sensor 62, and is 0.4 meters in this embodiment.

The travel distance Dist calculated in this way is approximately equal to an actual travel distance, when the pulse-missing at the low speed travel situation described the above does not occur. However, when the pulse-missing occurs, the travel distance is shortened. Therefore, at following step S144, it is detected whether the pulse-missing period occurs or not. In this detection, the speed pulse number SPN obtained at step S141 in the past is stored. When the speed pulse number SPN is changed from SPN>1 to SPN=0, and after that SPN is changed from SPN=0 to SPN>1, it is detected that the pulse-missing period occurs.

When the pulse-missing period does not occur (step S144: NO), the main process is discontinued. That is, the travel distance Dist as itself calculated at step S143 is used in the following steps.

When the pulse-missing period occurs (step S144: YES), a process of adding the distance estimated that the vehicle travels during the period.

At first, at step S145, the estimated travel distance from when the vehicle becomes low speed travel condition less than Vmin to when the vehicle stops is calculated. This is the "estimated travel distance $Dist_{down}$ at deceleration" shown in FIG. 3, and calculated by the following equation (1).

$$Dist_{down} = \Delta S_{down} / \Delta a_{down} \tag{1}$$

Here, $\Delta S_{down}$ is a vehicle speed at the changing point from a situation that the vehicle speed pulse is outputted to a situation that the vehicle pulse is not outputted, and is equal to Vmin shown in FIG. 3 (left side). $\Delta a_{down}$ is an acceleration (in this case, deceleration) just before the vehicle speed becomes less than $\Delta S_{down}$ (=Vmin). Therefore, the "estimated travel distance $Dist_{down}$ at deceleration" shown in FIG. 3 can be obtained.

Similarly, at step S146, the estimated travel distance from stop situation to when the vehicle becomes to or more Vmin is calculated. This is the "estimated travel distance $Dist_{up}$ at acceleration" shown in FIG. 3, and calculated by the following equation (2).

$$Dist_{up} = \Delta S_{up} / \Delta a_{up} \tag{2}$$

Here, $\Delta S_{up}$ is a vehicle speed at the changing point from the situation that the vehicle speed pulse is not outputted to the situation that the vehicle pulse is outputted, and is equal to Vmin shown in FIG. 3 (right side). $\Delta a_{up}$ is an acceleration just after the vehicle speed becomes to or more than $\Delta S_{up}$ (=Vmin). Therefore, the "estimated travel distance $Dist_{up}$ at acceleration" shown in FIG. 3 can be obtained.

At step S147, as shown in equation (3), the travel distance Dist is corrected by adding the estimated travel distances $Dist_{down}$ and $Dist_{up}$ calculated at steps S145, S146 to the travel distance Dist calculated at step S143.

$$Dist = Dist + Dist_{down} + Dist_{up} \quad (3)$$

After step S147, this process is discontinued. Therefore, in this case, the corrected travel distance Dist calculated at step S147 is used in the following processes.

Figure 5:
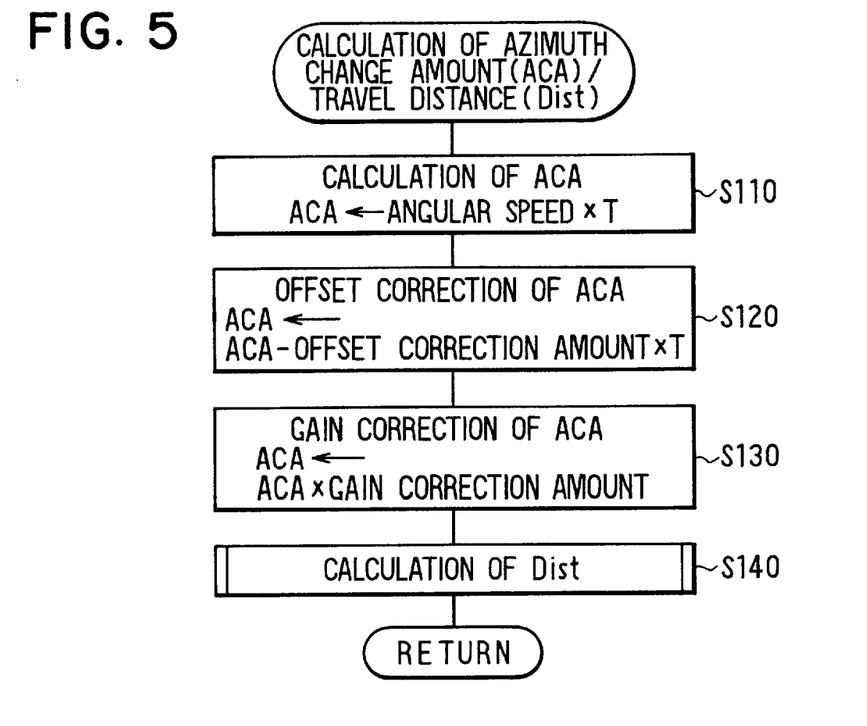
FIG. 5 is a flowchart illustrating a process of calculation of an azimuth change amount and a travel distance executed during the main process.

Back to FIG. 5, after step S140, this process is also discontinued, and then step S200 in FIG. 4 is executed.

At step S200, a relative locus calculation process is executed. This process will be explained in detail with reference to FIG. 7.

Figure 7:
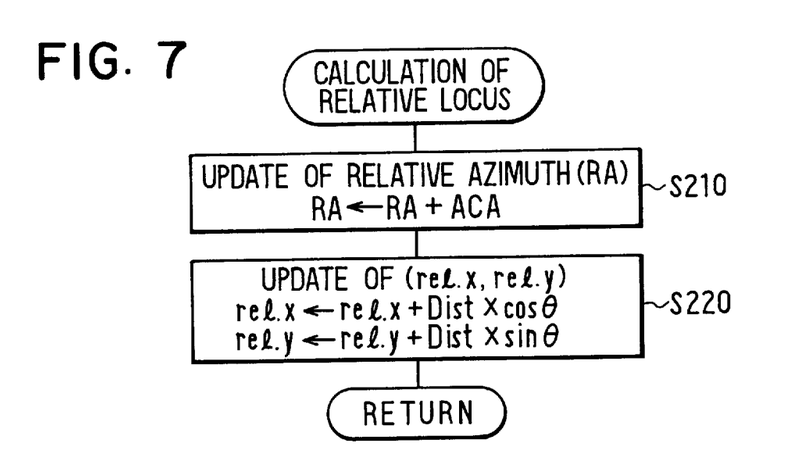
FIG. 7 is a flowchart illustrating a process of calculation of a relative locus during the main process.

At first, at step S210, a relative azimuth RA is updated by adding the azimuth change amount ACA calculated at step S130 to a relative azimuth RA previously calculated.

At step S220, a relative position coordinates is updated based on the update relative azimuth RA and the travel distance Dist calculated at step S140. Concretely, a relative coordinate rel.x, which sets a north-south direction as an x-coordinate axis, is updated based on an equation (4), a relative coordinate rel.y, which sets an east-west direction as a y-coordinate axis, is updated based on an equation (5). Here, $\theta$ represents the relative azimuth RA calculated at step S210.

$$rel.x \leftarrow rel.x + Dist \times \cos\theta \quad (4)$$

$$rel.y \leftarrow rel.y + Dist \times \sin\theta \quad (5)$$

These up-dates are achieved by adding x, y components of the relative azimuth RA for the travel distance Dist to relative position coordinates previously calculated. This relative position coordinates are calculated for calculating the relative locus, and are used in a map-matching described after.

After step S220, step S300 in FIG. 4 is executed.

At step S300, a present estimated position is determined by executing the map-matching process using a calculation result of the position calculation process by the dead-reckoning navigation described the above and a road data in the map data read from the map data input device 56. This map-matching process is executed by, for example, the following procedure. That is, a road, which has a road shape (road pattern) whose accordance rate (rate of approximation) against the travel locus of the vehicle calculated by the position calculation process is within a predetermined range, is searched. When there are roads whose accordance rate is within the predetermined range, one road whose accordance rate against the travel locus is the highest is selected in the searched roads. A position nearest to the newest present position calculated by the position calculation process on the selected road is determined as the present position. When there is no road whose accordance rate is within the predetermined range, the newest present position calculated by the position calculation process is determined as the present position.

Furthermore, at step S300, predetermined distance data of the travel locus of the vehicle is stored into a not-shown RAM and is updated by successively accumulating the vehicle present position decided by the above-mentioned method.

Here, in the foregoing explanation, as shown in FIG. 3, the method for estimating a vehicle behavior during the pulse-missing based on both just before and just after of the pulse-missing period is has explained, however, the travel distance during the pulse-missing period may be estimated based on transitions of the vehicle travel accelerations generated before and after the pulse-missing period. This estimation is focused on the point that a behavior of the vehicle when the vehicle decelerates is different from each other according to a travel situation until that timing and the way of driving of a driver. For example, in the case of the deceleration, a driver may strongly decelerate at first and gradually release the deceleration rate, or may softly decelerate at first and gradually strengthen the deceleration rate, and vice versa. It is thought the difference is likely to occur at the deceleration. Therefore, the vehicle behavior during the pulse-missing period can be adequately estimated based on the transition of the vehicle travel acceleration (deceleration).

Figure 8:
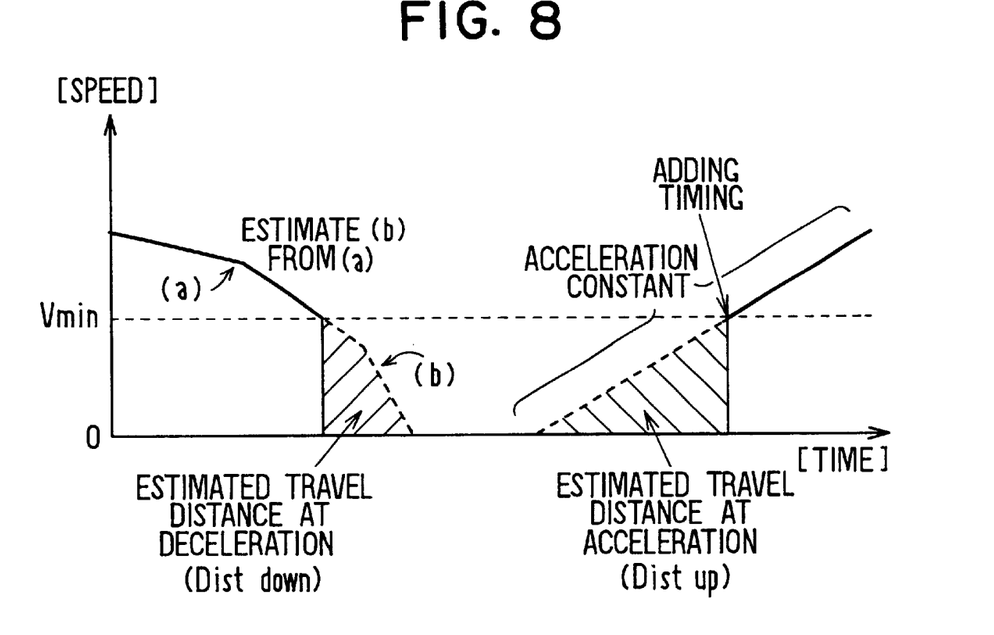
FIG. 8 is a diagram illustrating an another concept of a calculation of an estimated travel distance during a pulse-missing period.

For example, in the case shown in FIG. 8, the vehicle speed changing at the deceleration indicates the following behavior. The vehicle softly decelerates at first, and gradually strengthens the deceleration rate. In the case of this behavior, the estimated travel distance may be summed up relatively short based on only the acceleration (deceleration) just before the pulse-missing period. Therefore, the estimated travel distance against an actual vehicle behavior can be accurately calculated by calculating the estimated travel distance with assuming that the behavior, in which the deceleration rate is gradually strengthen, would continued.

As described the above, the process of vehicle present position calculation is executed by using the method, in which the estimated travel distances $Dist_{down}$ and $Dist_{up}$ at deceleration and at acceleration are calculated, and are added to the travel distance Dist calculated based on the vehicle speed pulse.

[2] Method using stored data (Part I)

In the above-described method [1], the travel distance during the pulse-missing period is estimated based on transitions of the vehicle travel accelerations generated before and after the pulse-missing period. In this method [2], a relationship between: the travel acceleration or its transition estimated to generate before and after the pulse-missing period; and the estimated travel distance during the pulse-missing period; based on a plurality of travel behavior of the vehicles, is stored, for example, after changed to a table form. When the travel acceleration or its transition generated before and after the pulse-missing period is set an index, searched data from the relationship table is used as the estimated travel distance during the pulse-missing.

Figure 9A:
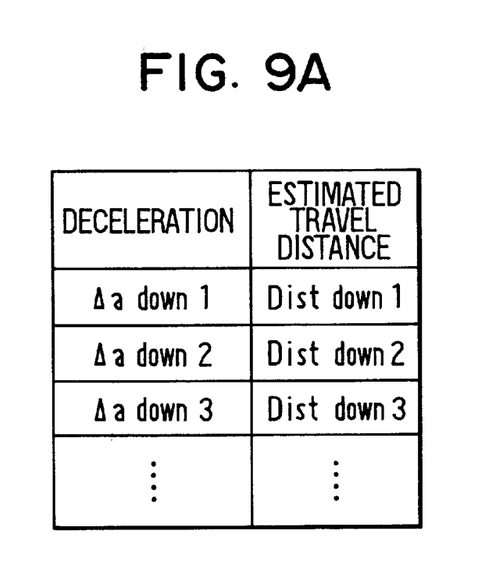
FIG. 9A is a diagram illustrating a relationship table between deceleration and the estimated travel distance.
Figure 9B:
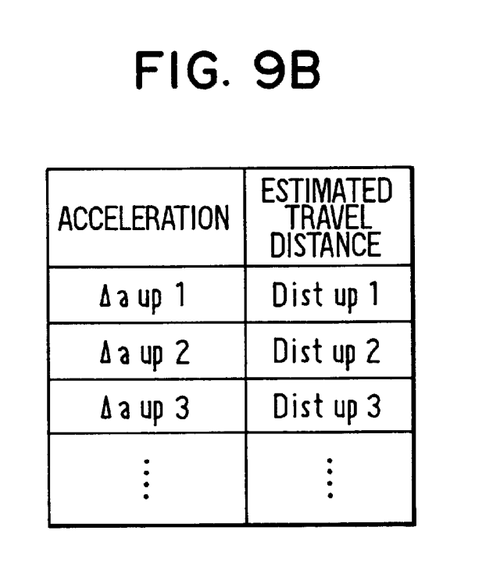
FIG. 9B is a diagram illustrating a relationship table between acceleration and the estimated travel distance.

For example, as shown in FIG. 9A, the estimated travel distances $Dist_{down1}$, $Dist_{down2}$, $Dist_{down3}$, . . . , which are previously calculated correspond to a plurality of decelerations $\Delta a_{down1}$, $\Delta a_{down2}$, $\Delta a_{down3}$, are stored in the table form. Similarly, as shown in FIG. 9A, the estimated travel distances $Dist_{up1}$, $Dist_{up2}$, $Dist_{up3}$, . . . , which are previously calculated correspond to a plurality of accelerations $\Delta a_{up1}$, $\Delta a_{up2}$, $\Delta a_{up3}$, . . . , are stored in the table form. Furthermore, at steps S145 and S146 of the travel distance Dist calculation process shown in FIG. 6, the estimated travel distances $Dist_{down}$ and $Dist_{up}$ just before and after the pulse-missing period can be obtained by referring the relationship table.

In this case, since it does not need a calculation, a process load in the navigation control portion decreases. Especially, since this invention is adapted to the vehicle navigation system, it is effective to decrease the process load.

Here, the relationship table is one for searching by using the acceleration just before and after the pulse-missing period as the index, however, the relationship table may be related to the case in which the acceleration is transited as the case shown in FIG. 8. For example, the estimated travel distances correspond to each of a plurality of deceleration behavior patterns are determined. Actually, since the determined deceleration behavior pattern hardly accords to the actual pattern, the closest pattern may be selected.

[3] Method using stored data (Part II)

In the above-mentioned method [2], the relationship between: the travel acceleration or its transition estimated to generate before and after the pulse-missing period; and the estimated travel distance during the pulse-missing period; based on a plurality of travel behavior of the vehicles, is stored. When it is desired further decreasing of the process load, the following method can be adopted. That is, the travel distance during the pulse-missing period is obtained by a simulation corresponds to a plurality of vehicle travel behaviors estimated to generate before and after the pulse-missing period. After that, a plurality of representative data decided based on the travel distance correspond to the obtained vehicle travel behaviors are memorized. The memorized representative data is used as the estimated travel distance during the pulse-missing period.

In the case of method [2], it needs to detect the vehicle travel acceleration or its transition before and after the pulse-missing period, however, this method [3] obtains the estimated travel distance using the fixed representative data. That is, it does not need to individually memorize the estimated travel distances for the pulse-missing at deceleration and at acceleration, but memorize only one representative data considering both of the deceleration and acceleration. Therefore, the process load dramatically decreases because the memorized representative data is merely uniformly added when the occurrence of the pulse-missing period is detected.

Now, when the representative data is decided, it is desired to adopt a statistical representative data such as a mode, an average or a median obtained based on measured value, which is obtained by measure with assuming a lot of acceleration/deceleration behaviors.

The present invention can be widely adopted to the other embodiment other than the above-mentioned embodiment.

For example, the present invention is adopted to the navigation system 1 in the above embodiment, however, it can be adopted to the other system performing operations other than navigation by using the detected present position.

Furthermore, in the above embodiment, the vehicle present position or travel direction is calculated based on outputs from the GPS receiver 64 as well as the gyroscope 60 and the vehicle speed sensor 62 at the present position detection, however, the present position and the travel direction can be calculated based on at least outputs from the gyroscope 60 and the vehicle speed sensor 62. Here, the correction using the map-matching is not essential.

Furthermore, the gyroscope 60 is an example of the azimuth sensor. It may obtain an azimuth data by, for example, detecting earth magnetism or accumulating a steering angle of a vehicle obtainable from a rotary difference of a steering wheel.

Here, the present position detection described the above can be realized by, for example, a program which is to be read and executed by a computer system. In such a case, the program is readably recorded in a recording medium such as a floppy disk, a magneto-optic disk, CD-ROM, and a hard disk, and is loaded onto the computer system and is initialized thereon. Furthermore, the program may be recorded in a ROM, a back-up RAM as the recording medium readable by the computer system, and may be executed by mounting the ROM or the back-up RAM into the computer system.

What is claimed is:

1. A vehicle present position detection apparatus, comprising:

an azimuth sensor that outputs an azimuth signal corresponding to an azimuth change amount of a vehicle;

a speed sensor that outputs pulse signals at an interval corresponding to a travel speed of the vehicle;

acceleration calculating means for calculating a travel acceleration of the vehicle based on the pulse signals outputted from the speed sensor; and present position calculating means for calculating a present position of the vehicle by a dead-reckoning navigation calculation using the azimuth change amount calculated based on the azimuth signal outputted by the azimuth sensor and a travel distance calculated based on the pulse signals outputted by the speed sensor, wherein the present position calculating means performs the dead-reckoning navigation calculation based on a corrected travel distance, which is the travel distance calculated based on the pulse signals outputted from the speed sensor and is corrected by adding an estimated travel distance during a pulse-missing period during which the pulse signals are not outputted from the speed sensor when the vehicle travels, and the present position calculating means estimates the estimated travel distance based on the travel accelerations before and after the pulse-missing period.

2. A vehicle present position detection apparatus according to claim 1, wherein the present position calculating means estimates the estimated travel distance based on the travel accelerations just before and just after the pulse-missing period.

3. A vehicle present position detection apparatus according to claim 1, wherein the travel acceleration just before the pulse-missing period is a deceleration just before the pulse-missing period, and the travel acceleration just after the pulse-missing period is a acceleration just after the pulse-missing period.

4. A vehicle present position detection apparatus according to claim 1, wherein the present position calculating means estimates the estimated travel distance based on transitions of the travel accelerations just before and just after the pulse-missing period.

5. A vehicle present position detection apparatus according to claim 1, wherein the present position calculating means estimates the estimated travel distance based on one of a travel acceleration and a transition of the travel acceleration during the pulse-missing period estimated based on one of the travel accelerations before and after the pulse-missing period and transitions of the travel accelerations before and after the pulse-missing period.

6. A vehicle present position detection apparatus according to claim 1, further comprising:

relationship storing means for storing a relationship between: one of a travel acceleration and a transition of the travel acceleration corresponding to a plurality of vehicle travel behaviors estimated to occur before and after the pulse-missing period; and the estimated travel distance during the pulse-missing period, wherein the present position calculating means estimates the estimated travel distance based on a searched data from the relationship storing means by using one of a travel acceleration and a transition of the travel acceleration occurred before and after the pulse-missing period as an index.

7. A vehicle present position detection apparatus according to claim 1, further comprising:

representative data storing means for storing representative data decided based on a travel distance with respect to a plurality of vehicle travel behavior, the travel distance being decided by a simulation with respect to a plurality of vehicle travel behavior estimated to occur before and after the pulse-missing period, wherein the present position calculating means uses the representative data stored in the representative data storing means as the estimated travel distance during the pulse-missing period.

8. A vehicle present position detection apparatus according to claim 1, further comprising:

a radio receiver that receives a radio for a radio navigation and outputs an absolute present position and a travel direction of the vehicle, wherein the present position calculating means corrects the present position of the vehicle obtained by the dead-reckoning navigation calculation by using the absolute present position and the travel direction of the vehicle outputted from the radio receiver.

9. A vehicle present position detection apparatus according to claim 1, wherein the present position calculating means includes:

travel locus generating means for generating a travel locus until the present position of the vehicle; and map-matching correcting means for correcting the present position of the vehicle by using a map-matching process that compares the travel locus generating by the travel locus generating means with a road data based on a map data.

10. A vehicle present position detection apparatus, comprising:

an azimuth sensor that outputs an azimuth signal corresponding to an azimuth change amount of a vehicle;

a speed sensor that outputs pulse signals at an interval corresponding to a travel speed of the vehicle;

present position calculating means for calculating a present position of the vehicle by a dead-reckoning navigation calculation using the azimuth change amount calculated based on the azimuth signal outputted by the azimuth sensor and a travel distance calculated based on the pulse signals outputted by the speed sensor; and relationship storing means for storing a relationship between: vehicle travel behaviors estimated to occur before and after the pulse-missing period; and the estimated travel distance during the pulse-missing period, wherein the present position calculating means performs the dead-reckoning navigation calculation based on a corrected travel distance, which is the travel distance calculated based on the pulse signals outputted from the speed sensor and is corrected by adding an estimated travel distance during a pulse-missing period during which the pulse signals are not outputted from the speed sensor when the vehicle travels, and the present position calculating means estimates the estimated travel distance based on a searched data from the relationship storing means by using the vehicle travel behaviors occur before and after the pulse-missing period as an index.

11. A vehicle present position detection apparatus, comprising:

an azimuth sensor that outputs an azimuth signal corresponding to an azimuth change amount of a vehicle;

a speed sensor that outputs pulse signals at an interval corresponding to a travel speed of the vehicle;

present position calculating means for calculating a present position of the vehicle by a dead-reckoning navigation calculation using the azimuth change amount calculated based on the azimuth signal outputted by the azimuth sensor and a travel distance calculated based on the pulse signals outputted by the speed sensor; and relationship storing means for storing a relationship between: one of a travel acceleration and a transition of the travel acceleration corresponding to a plurality of vehicle travel behaviors estimated to occur before and after the pulse-missing period; and the estimated travel distance during the pulse-missing period, wherein the present position calculating means performs the dead-reckoning navigation calculation based on a corrected travel distance, which is the travel distance calculated based on the pulse signals outputted from the speed sensor and is corrected by adding an estimated travel distance during a pulse-missing period during which the pulse signals are not outputted from the speed sensor when the vehicle travels, and the present position calculating means estimates the estimated travel distance based on a searched data from the relationship storing means by using one of a travel acceleration and a transition of the travel acceleration occurring before and after the pulse-missing period as an index.

12. A vehicle present position detection apparatus according to claim 10, wherein the travel acceleration just before the pulse-missing period is a deceleration just before the pulse-missing period, and the travel acceleration just after the pulse-missing period is a acceleration just after the pulse-missing period.

13. A vehicle present position detection apparatus, comprising:

an azimuth sensor that outputs an azimuth signal corresponding to an azimuth change amount of a vehicle;

a speed sensor that outputs pulse signals at an interval corresponding to a travel speed of the vehicle;

present position calculating means for calculating a present position of the vehicle by a dead-reckoning navigation calculation using the azimuth change amount calculated based on the azimuth signal outputted by the azimuth sensor and a travel distance calculated based on the pulse signals outputted by the speed sensor; and representative data storing means for storing representative data decided based on a travel distance with respect to a plurality of vehicle travel behavior, the travel distance being decided by a simulation with respect to a plurality of vehicle travel behavior estimated to occur before and after the pulse-missing period, wherein the present position calculating means performs the dead-reckoning navigation calculation based on a corrected travel distance, which is the travel distance calculated based on the pulse signals outputted from the speed sensor and is corrected by adding an estimated travel distance during a pulse-missing period during which the pulse signals are not outputted from the speed sensor when the vehicle travels, and the present position calculating means uses the representative data stored in the representative data storing means as the estimated travel distance during the pulse-missing period.

14. A vehicle present position detection apparatus, comprising:

acceleration calculating means for calculating a travel acceleration of a vehicle based on a pulse signals inputted at an interval corresponding to a travel speed of the vehicle; and present position calculating means for calculating a present position of the vehicle by a dead-reckoning navigation calculation using an azimuth change amount calculated based on an azimuth signal and a travel distance calculated based on the pulse signals, wherein the present position calculating means performs the dead-reckoning navigation calculation based on a corrected travel distance, which is the travel distance calculated based on the pulse signals and is corrected by adding an estimated travel distance during a pulse-missing period during which the pulse signals are not inputted thereto when the vehicle travels, and the present position calculating means estimates the estimated travel distance based on at least one of the travel accelerations before and after the pulse-missing period.

15. A vehicle present position display apparatus including the vehicle present position detection apparatus according to claim 1, further comprising:

map data storing means for storing a map data including a road map data;

map displaying means for displaying the road map data around the present position of the vehicle detected by the vehicle present position detection apparatus which is read from the map data storing means as a road map.

16. A vehicle present position display apparatus, comprising:

a vehicle present position detection portion including:
an azimuth sensor that outputs an azimuth signal corresponding to an azimuth change amount of a vehicle;
a speed sensor that outputs pulse signals at an interval corresponding to a travel speed of the vehicle;
acceleration calculating means for calculating a travel acceleration of the vehicle based on the pulse signals outputted from the speed sensor; and
present position calculating means for calculating a present position of the vehicle by a dead-reckoning navigation calculation using the azimuth change amount calculated based on the azimuth signal outputted by the azimuth sensor and a travel distance calculated based on the pulse signals outputted by the speed sensor,
wherein the present position calculating means performs the dead-reckoning navigation calculation based on a corrected travel distance, which is the travel distance calculated based on the pulse signals outputted from the speed sensor and is corrected by adding an estimated travel distance during a pulse-missing period during which the pulse signals are not outputted from the speed sensor when the vehicle travels, and the present position calculating means estimates the estimated travel distance based on the travel accelerations before and after the pulse-missing period; and a display portion including:
map data storing means for storing a map data including a road map data; and
map displaying means for displaying the road map data around the present position of the vehicle detected by the vehicle present position detection apparatus which is read from the map data storing means as a road map.

17. A navigation system including the vehicle present position display apparatus according to claim 14, further comprising:

route guidance means for recognizably displaying a route to a predetermined destination and the present position of the vehicle detected by the vehicle present position detection apparatus on the road map displayed by the map displaying means, and performing a route guidance in view of a relationship between the route to the predetermined destination and the present position of the vehicle.

18. A navigation system, comprising:

a vehicle present position detection portion including:
an azimuth sensor that outputs an azimuth signal corresponding to an azimuth change amount of a vehicle;
a speed sensor that outputs pulse signals at an interval corresponding to a travel speed of the vehicle;
acceleration calculating means for calculating a travel acceleration of the vehicle based on the pulse signals outputted from the speed sensor; and
present position calculating means for calculating a present position of the vehicle by a dead-reckoning navigation calculation using the azimuth change amount calculated based on the azimuth signal outputted by the azimuth sensor and a travel distance calculated based on the pulse signals outputted by the speed sensor,
wherein the present position calculating means performs the dead-reckoning navigation calculation based on a corrected travel distance, which is the travel distance calculated based on the pulse signals outputted from the speed sensor and is corrected by adding an estimated travel distance during a pulse-missing period during which the pulse signals are not outputted from the speed sensor when the vehicle travels, and the present position calculating means estimates the estimated travel distance based on the travel accelerations before and after the pulse-missing period;

a display portion including:
map data storing means for storing a map data including a road map data; and
map displaying means for displaying the road map data around the present position of the vehicle detected by the vehicle present position detection apparatus which is read from the map data storing means as a road map; and route guidance means for recognizably displaying a route to a predetermined destination and the present position of the vehicle detected by the vehicle present position detection apparatus on the road map displayed by the map displaying means, and performing a route guidance in view of a relationship between the route to the predetermined destination and the present position of the vehicle.

19. A recording medium for recording a program being readable by a computer system, the program comprising:

acceleration calculating means for calculating a travel acceleration of a vehicle based on a pulse signals inputted at an interval corresponding to a travel speed of the vehicle; and present position calculating means for calculating a present position of the vehicle by a dead-reckoning navigation calculation using an azimuth change amount calculated based on an azimuth signal and a travel distance calculated based on the pulse signals, wherein the present position calculating means performs the dead-reckoning navigation calculation based on a corrected travel distance, which is the travel distance calculated based on the pulse signals and is corrected by adding an estimated travel distance during a pulse-missing period during which the pulse signals are not inputted thereto when the vehicle travels, and the present position calculating means estimates the estimated travel distance based on the travel accelerations before and after the pulse-missing period.

* * * * *